United States Patent [19]

De Neefe

[11] Patent Number: 5,759,330

[45] Date of Patent: Jun. 2, 1998

[54] METHOD FOR MAKING A RETRO-REFLECTIVE IDENTIFICATION PLATE

[75] Inventor: Francis Xavier De Neefe, East Kew, Australia

[73] Assignee: Sir Harry Flashman & Associates, A Division of Francis De Neefe Holdings PTY. LtD., Heidelberg Heights, Australia

[21] Appl. No.: 311,966

[22] Filed: Sep. 26, 1994

[30] Foreign Application Priority Data

Mar. 26, 1992 [AU] Australia .................. PL1562
Mar. 23, 1993 [WO] WIPO ............. PCT/AU93/00116

[51] Int. Cl.$^6$ ................................................ B32B 31/00
[52] U.S. Cl. ..................... 156/248; 156/247; 156/268
[58] Field of Search .......................... 156/247, 248, 156/268

[56] References Cited

U.S. PATENT DOCUMENTS

| | | | |
|---|---|---|---|
| 1,573,295 | 9/1926 | Bougeois | 156/248 |
| 1,904,850 | 4/1933 | Boyce | 40/552 |
| 2,207,585 | 7/1940 | Gasper | 40/135 |
| 2,876,575 | 3/1959 | Leika | 41/26 |
| 3,405,025 | 10/1968 | Goldman | 161/4 |
| 3,811,983 | 5/1974 | Rowland | 156/245 |
| 4,919,741 | 4/1990 | Chirhart et al. | 156/223 |
| 5,229,882 | 7/1993 | Rowland | 359/530 |
| 5,264,063 | 11/1993 | Martin | 156/247 |

FOREIGN PATENT DOCUMENTS

| | | | |
|---|---|---|---|
| 28 11 656 | 9/1979 | Germany | |
| 3122207 | 12/1982 | Germany | 156/268 |

*Primary Examiner*—David A. Simmons
*Assistant Examiner*—M. Alexandra Elve
*Attorney, Agent, or Firm*—Renner, Kenner, Greive Bobak, Taylor & Weber

[57] ABSTRACT

An identification plate which enables identification by visual and optionally electronic means is provided comprising a retro-reflective plate having two regions of differing retro-reflectivity separated by non-retro-reflective boarder portions, the visual information providing regions having the higher retro-reflectivity, and optionally including a passive chip or tag. A method of manufacturing such an identification plate is also provided.

4 Claims, 1 Drawing Sheet

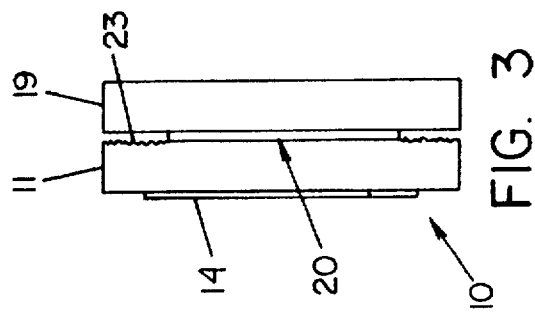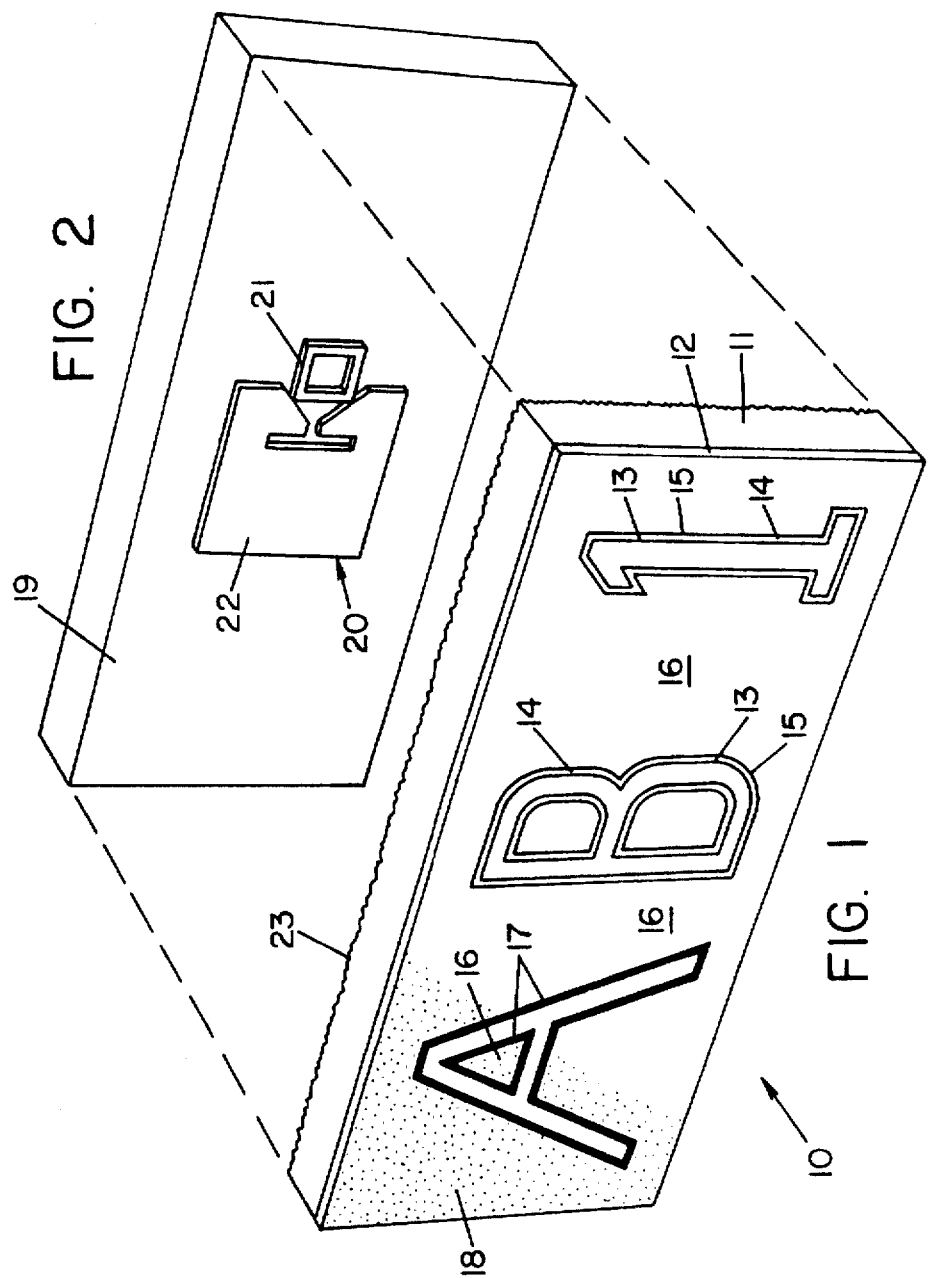

METHOD FOR MAKING A RETRO-REFLECTIVE IDENTIFICATION PLATE

This application is a continuation of PCT application No. PCT/AU93/00116 filed Mar. 23, 1993.

FIELD OF THE INVENTION

This invention relates to a visible identification plate for a vehicle or other mobile apparatus for which identification by visual and/or electronic means is desirable. In one particular aspect the invention may be more generally considered in relation to a number plate for a vehicle.

The invention also relates to a method of producing an identification plate having visual and/or electronic identification means, as disclosed hereinafter.

DESCRIPTION OF THE PRIOR ART

Identification plates are advantageously highly visible both during the day and at night, easily read both during the day and at night, and, economical to manufacture.

It is also advantageous if an identification plate can be easily and economically manufactured to incorporate a passive chip of the type which will electronically "feedback" information contained on the chip, which may be specific to that identification plate, when the plate is in the proximity of electronic means enabling information on the chip to be read.

One of the more advantageous aspects of visual identification plates at night time, particularly but not exclusively, those used as number plates on vehicles, occurs when the whole identification plate is reflective to impinging light (hereinafter referred to as "retroreflective") rather than only the readable information thereon being retro-reflective.

When a retro-reflective material is positioned on a retro-reflective background of the same or different degree of retro-reflectivity, a problem with halation arises. This problem is greatest when the information to be read on the plate is the more highly retro-reflective portion of the plate. When light is reflected from such an information plate the information becomes difficult or impossible to read because of a "halo" effect which is created around the edges of the more reflective information, tending to blur the image and merge the light reflected from the plate into a diffuse image. This may be caused by the more highly reflective nature of part of the plate, overpowering the less reflective portion, or, by a tendency of the reflected light to be more diffuse by nature. The applicant does not wish to be bound by either of these possible theories, however.

In the case of a vehicle number plate it means that the more retro-reflective portion, that is, the numbers or letters which make up the information part of the plate, can be difficult or impossible to read at night, if the entire plate is made reflective. Yet, a substantial degree of retro-reflectivity is highly desirable from a safety point of view, at night, in relation to number plates of motor vehicles.

SUMMARY OF THE INVENTION

It is an object of the present invention to provide a visual identification plate which is substantially completely retro-reflective, in which the information desired to be visually read has a different retro-reflectivity from the remainder of the identification plate, and in which the halation effect which occurs with a combination of retro-reflective surfaces is substantially reduced.

It is also an object of the invention to provide an economical method of manufacturing such a visual identification plate, in which a passive chip, such as a surface acoustic device, may be included. Such a device will be referred to as a "tag".

For the purposes of this specification a "tag" is defined as an electronic unit which includes a unique encoded number and/or additional information, and, means which allows the number and/or the other information to be read remotely by electronic scanning means at a reading point.

In one aspect of the invention there is provided an identification plate, including; a retro-reflective material forming the substantial majority of the surface of the plate; said surface having a first and a second main regions of differing retro-reflectivity, said regions together constituting the substantial majority of said surface; said first region being more retro-reflective than said second region, and being separated therefrom by a non-retro-reflective border portion; whereby to reduce the halation effect of said first region sufficiently to allow it to be visually read when light is reflected from said surface.

In another aspect of this embodiment of the invention the border portion is of substantially uniform thickness.

In another aspect the invention provides a method of producing an identification plate comprising; masking a sheet of retro-reflective material; cutting said mask to define a plurality of information regions; further cutting said mask around the outline of said plurality of information regions whereby to provide a plurality of border portions adjacent thereto; whereby the remainder of said mask covers one or more background regions; removing said mask material at said border portions; rendering the exposed plate in the area corresponding to said border portions non-retro-reflective; removing the mask material corresponding to the one or more background regions; treating the exposed plate in the area corresponding to said one or more background regions to reduce the retro-reflectivity thereof; and, removing the mask material from said information regions.

In one embodiment of the method there is included the additional step of securing a tag (as hereinafter defined) to a non-metallic backing plate secured to the retro-reflective material, to complete the construction of the identification plate.

In a second embodiment of the method of the invention, the plate is rendered non-retro-reflective in the border portions by application of a light-impermeable coatings after removal of the mask material therefrom.

In another embodiment of this aspect the one or more background regions are coated with a transparent, colored material after removal of the mask, from the area corresponding to the one or more background regions.

In another embodiment of the method of the invention, after removal of the mask covering the information regions, it may be desired, where for instance an information area is relatively large, to treat that, or all the, information area or areas to slightly reduce their retro-reflectivity. However, the extent of reduction would be less than that applied to the background regions of the identification plate.

In a preferred embodiment of the invention the retro-reflective material is a high intensity corner-cube material formed of rigid plastics material.

In a still further embodiment of this aspect the mask to made from a material having an adhesive backing and covers substantially the whole surface of the retro-reflective matter.

In order that the invention may be more clearly understood a description will now be provided of a particularly preferred embodiment of the invention, in relation to a method for producing a vehicle number plate and with reference to the accompanying drawings. Thee description is in no way limiting on the invention.

BRIEF DESCRIPTION OF THE DRAWINGS

FIG. 1 shows one embodiment of a vehicle number plate in accordance with the invention;

FIG. 2 shows a second embodiment of vehicle number plate in which a passive chip is to be constructed in the number plate;

FIG. 3 is a side view of the second embodiment of FIG. 2 in assembled form.

DESCRIPTION OF THE PREFERRED EMBODIMENT

Referring to the drawings and to FIG. 1 there is shown a vehicle number plate 10, consisting of a sheet 11 of rigid retro-reflective high intensity corner-cube plastics material which has a high degree of retro-reflectivity. Sheet 11 is of the size of a vehicle number plate and is provided on the front face thereof with a ask 12, which is a sheet of adhesive backed material.

Sheet 11 and mask 12 are treated by a letter number punch machine which provides cuts 13 (seen on the numeral 1 and letter B of FIG. 1) through mask 12 to firstly define the information regions of number plate 10, in this case the letters A, B and the numeral 1 and letter B, and which secondly, provides cuts 15 (also seen on the numeral 1) which define border portions 14 surrounding each edge of the letters and numbers. The remaining area of sheet 11 is a background region 16. Such letter/number punch machines are well known in the art and provide substantially even border portions 14 corresponding to the outline of the letters and numbers used.

After mask 12 is cut in this manner, sheet 11 is treated to remove border portions 14, exposing part of the retro-reflective sheet 11. The front face of sheet 11 and mask 12 are then sprayed with a black coating material 17 (seen on the letter A of FIG. 1), and dried. Background region 16 of mask 12 is then removed and the front face of sheet 11 and mask 12 are then sprayed with a transparent colored coating 18 (shown in part as a shaded area on the left hand side of FIG. 1) which covers both background region 16 and border portion 14.

Because coating 18 is transparent background region 16 of number plate 10 are still retro-reflective but to a lesser degree than an uncoated portion.

Finally, the remaining portions of mask 12, those portions corresponding to the letters A, B and the numeral 1, are removed.

Because of the presence of non-reflective border portions 14 around each of the information areas, the halation effect described above is substantially diminished and the information is readily visually readable at night. During the day the information is also readily readable, because the outlining of the information areas by the black border portions 14, make the information areas highly visible and clearly readable.

While the applicant does not wish to be limited to any particular theory, it is believed that the border portions 14 act in two ways, firstly during the day to highlight the information provided on the number plate, that is the letters or numbers which make up the information carried by the plate, and, at night to reduce the halation effect as the number plate reflects impinging light.

At night, light impinging on the number plate is reflected more by the information portions, that is the letters or numbers, and they stand out more strongly because of their higher retro-reflectivity. They are easily readable in a number plate constructed in accordance with the invention, without the halation effect blurring or distorting the readability of the number plate as a whole.

If it is desired, any additional information may be added to number plate 10, by spraying the information on to the front of sheet 11 with a light-impervious coating material. Such information could relate to the authority issuing the number plate, to advertising material, or, to any other material desired by the relevant authority to be contained on number plate 10.

Referring now to FIG. 2, there is shown a second embodiment of the invention in which a non-metallic backing plate 19 is provided on which is positioned a tag 20. Backing plate 19 is brought into contact with sheet 11, as indicated by the broken lines, to sandwich tag 20 between sheet 11 and plate 19. Plate 19 is secured to sheet 11 by any suitable means, and such means include adhesive.

Tag 20 is formed in two parts, a surface acoustic wave micro chip 21 and a flat antenna portion 22. The reason tag 20 is sandwiched between the back of retro-reflective sheet 11 and the non-metallic bang plate 19 is so that, should number plate 10 be mounted directly to a metal fitting, tag 20 is spaced sufficiently therefrom to avoid interference from that metal fitting when reading of the information on tag 20 by electronic scanning means is performed.

FIG. 3 shows assembled number plate 10 consisting of light impervious border portions 14, sheet 11, backing plate 19 and tag 20. The wavy portion 23 represents the cubed surface of the retro-reflective sheet 11.

If desired, for instance, for reasons of protection from the elements or to alter the overall retro-reflective characters of the number plate, one or more other transparent or translucent coatings may be sprayed on the number plate 10, either during the process steps outlined above, or before, or after.

I claim:

1. A method of producing an identification plate comprising positioning a mask on a sheet of retro-reflective material; cutting said mask to define a plurality of information regions; further cutting said mask around the outline of said plurality of information regions to provide a plurality of border portions adjacent thereto; whereby the remainder of said mask covers one or more background regions; removing said mask material at said border portions; rendering the exposed plate in the area corresponding to said border portions non-retro-reflective; removing the mask material corresponding to the one or more background regions; treating the exposed plate in the area corresponding to said one or more background regions to reduce the retro-reflectivity thereof; and, removing the mask material from said information regions.

2. A method as claimed in claim 1 wherein a tag mounted on a non-metallic plate is secured to the back of said sheet of retro-reflective material to form the identification plate.

3. A method as claimed in claim 1 wherein said one or more background regions are rendered less retro-reflective by application of a transparent, colored coating material thereto.

4. A method as claimed in claim 1 wherein said plurality of border portions are rendered non-retro-reflective by application of an opaque coating thereto.

* * * * *